US007098410B2

(12) United States Patent
Galtier et al.

(10) Patent No.: US 7,098,410 B2

(45) Date of Patent: Aug. 29, 2006

(54) WEIGHING MODULE FOR WEIGHING ON THE FLY

(75) Inventors: Olivier Galtier, Paris (FR); Christian Nicolas, Chatuzange le Goubet (FR); Didier Painault, Bagnolet (FR)

(73) Assignee: Neopost Industrie, Bagneux (FR)

( * ) Notice: Subject to any disclaimer, the term of this patent is extended or adjusted under 35 U.S.C. 154(b) by 208 days.

(21) Appl. No.: 10/770,109

(22) Filed: Feb. 2, 2004

(65) Prior Publication Data

US 2004/0173386 A1 Sep. 9, 2004

(30) Foreign Application Priority Data

Jan. 31, 2003 (FR) .................................. 03 01162

(51) Int. Cl.
*G01G 19/414* (2006.01)

(52) U.S. Cl. ........................ 177/1; 177/25.15; 705/407

(58) Field of Classification Search ............. 177/25.15, 177/1; 705/407, 414–416
See application file for complete search history.

(56) References Cited

U.S. PATENT DOCUMENTS 2,688,878 A * 9/1954 Kolisch ....................... 73/865
2,708,368 A * 5/1955 Kolisch ....................... 73/865
2,812,904 A * 11/1957 Kolisch ....................... 705/414
4,872,521 A * 10/1989 Abellana et al. ......... 177/25.15
5,154,246 A * 10/1992 DiGiulio et al. ......... 177/25.15
5,178,224 A * 1/1993 DiGiulio et al. ......... 177/25.15
5,190,115 A * 3/1993 Dolan et al. ............. 177/25.15
5,726,393 A * 3/1998 Lyga ....................... 177/25.15
5,793,652 A 8/1998 DeBarber et al. ........... 364/567
5,831,220 A 11/1998 Ramsden et al. .............. 177/1
5,909,013 A * 6/1999 Dlugos .................... 177/25.11
6,759,602 B1 * 7/2004 Miller et al. ............. 177/25.15
2003/0225712 A1 * 12/2003 Cooper et al.
2004/0122778 A1 * 6/2004 Massucci et al.

FOREIGN PATENT DOCUMENTS

EP 0871145 10/1998
FR 2388352 11/1978

* cited by examiner

*Primary Examiner*—Randy W. Gibson
(74) *Attorney, Agent, or Firm*—Perman & Green, LLP

(57) ABSTRACT

A weighing module comprising a weighing platform incorporating a weighing cell and a motorized drive belt for transporting a mail item from one side to the other of the weighing platform, means for sensing the format of said mail item and processing means for calculating the weight of said mail item within a particular range of weights obtained beforehand from said format.

6 Claims, 3 Drawing Sheets

WEIGHING MODULE FOR WEIGHING ON THE FLY

FIELD OF THE INVENTION

The specific field of the invention is that of processing mail. The invention is directed more particularly to a dynamic weighing module disposed between a mail item feeder module and a mail item franking module in a mail processing machine.

PRIOR ART

Dynamic weighing machines for use with franking machines are well known in the art, and French Application No. 2 388 352 describes one particular example of machines of this kind, which comprise a weighing platform and drive belts for automatically transporting mail items from one side to the other of the platform. The weighing module may be used on its own, but is usually inserted into a mail processing system between the entry of a franking module and the exit of a feeder module from which closed envelopes to be franked are ejected.

In such devices, weighing is effected "on the fly", i.e. as the envelope passes through the weighing module, and without any interruption to the transportation of the envelope. It appears that if the processing throughput is high, in practice greater than 8000 envelopes per hour (i.e. more than two envelopes per second), weighing cannot be effected without reducing the speed at which the envelopes are transported and therefore reducing the overall franking throughput.

OBJECT AND DEFINITION OF THE INVENTION

The invention proposes to alleviate this drawback by providing a weighing module utilizing an improved weighing method to process envelopes on the fly at particularly high throughputs, in particular throughputs of more than 8000 envelopes per hour. One object of the invention is to enable such processing without significant structural modification of the weighing module.

The above objects are achieved by a weighing module comprising a weighing platform incorporating a weighing cell and a motorized drive belt for transporting a mail item from one side to the other of the weighing platform, which weighing module comprises means for sensing the format of said mail item and processing means for calculating the weight of said mail item within a particular range of weights obtained from said format.

Accordingly, by predetermining a weight range as a function of the format of the envelope at the entry of the weighing module, it is possible to speed up very considerably the measurement of the actual weight of the envelope and thus to obtain a value for the weight of the envelope before it leaves the weighing module and without reducing the speed at which the envelope is transported.

The format sensing means comprise means for sensing the length of said mail item, means for sensing the thickness of said mail item, and means for sensing the width of said mail item. Said means for sensing the length of said mail item preferably include a flag, said means for sensing the thickness of said mail item preferably include a Hall effect sensor, and said means for sensing the width of said mail item preferably include an optical sensor.

The processing means include a system for amplifying a measurement signal supplied by said weighing cell and the gain of said system is varied selectively as a function of the format of the mail item.

BRIEF DESCRIPTION OF THE DRAWINGS

Other features and advantages of the present invention emerge more clearly from the following description, which is given by way of non-limiting and illustrative example and with reference to the appended drawings, in which.

DETAILED DESCRIPTION OF A PREFERRED EMBODIMENT

Figure 1:
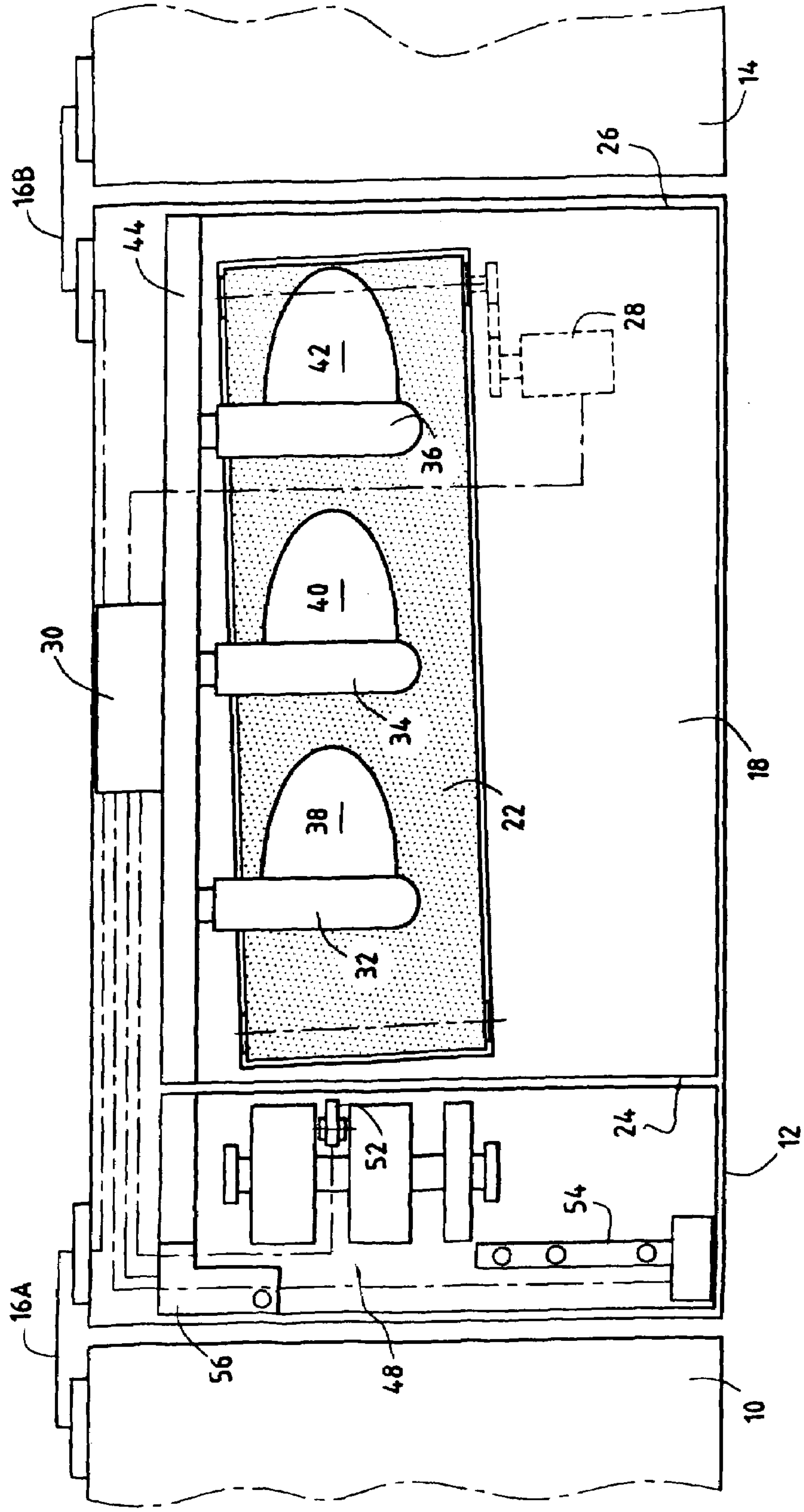
FIG. 1 is a plan view of a weighing module of the invention.

A mail processing machine conventionally comprises, from an upstream end to a downstream end relative to the direction of forward movement of mail items through the machine, a mail item feeder module 10, a dynamic weighing module 12, and a franking module 14. Each of these modules is connected to the preceding module by a data link 16A, 16B.

The above kind of machine can frank mail items of different formats, from the US format No. 5 (76.2 millimeters (mm)×127 mm) to the European B4 format (250 mm×353 mm) via the European C6/C5 format (114 mm×229 mm), and of up to a particular thickness, for example 16 mm, corresponding to the height of the slot through which mail items are fed into the feeder.

Figure 2:
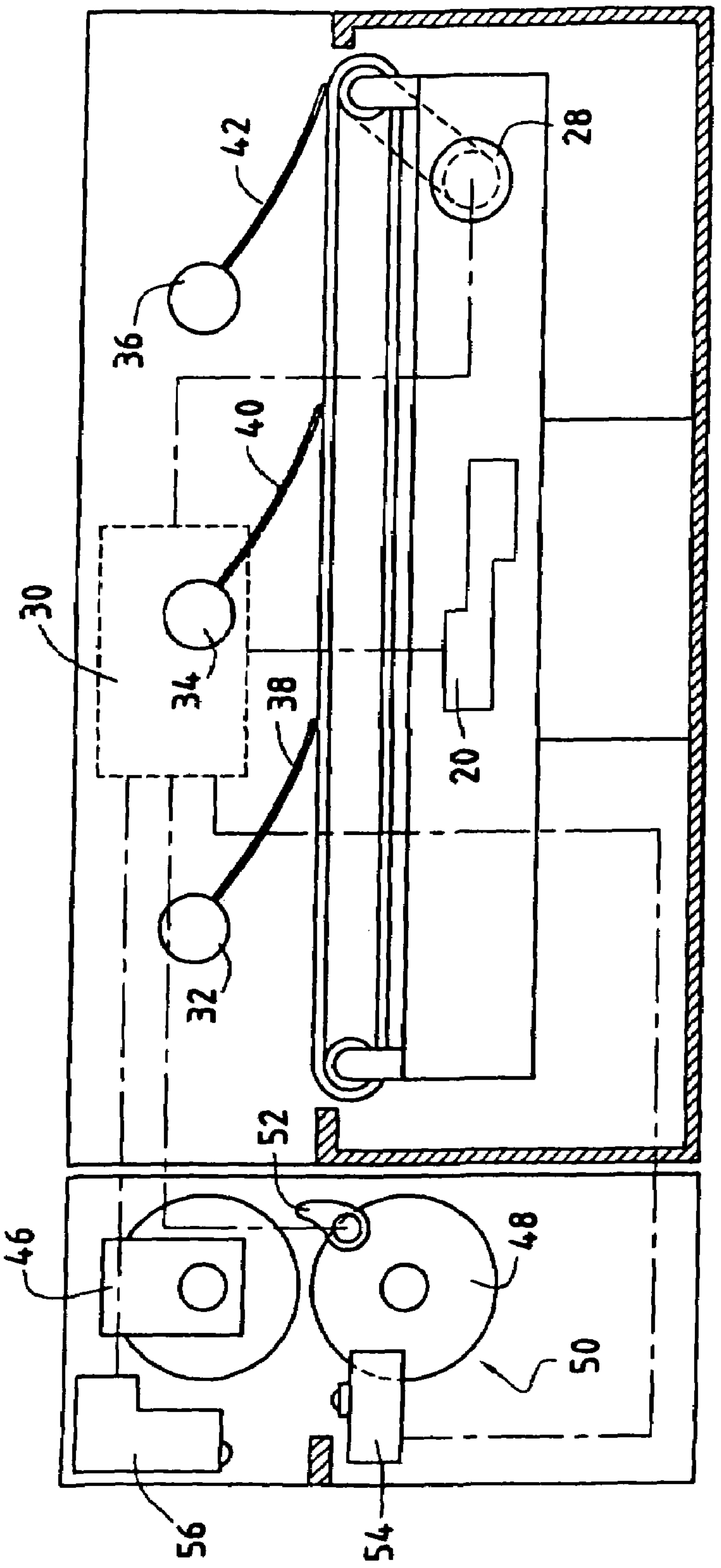
FIG. 2 is a view in longitudinal section of the FIG. 1 weighing module of the invention.

As shown in FIGS. 1 and 2, the weighing module 12 includes a weighing platform 18 with a weighing cell 20 and a single drive belt 22 for transporting mail items from one side to the other of the platform, to be more precise from a position upstream of the platform, at an upstream transverse face 25 of the weighing platform, to a downstream position, at a downstream transverse face 26 of the platform. The conveyor belt is driven by a drive motor 28, advantageously an electric motor, controlled by the processing means 30, which advantageously include a microprocessor circuit that also manages information sent over the data links.

A mail item retaining device adapted to press the transported mail items onto the weighing platform comprises (for example) three bearing members disposed one after the other in the transport direction of the mail items and each formed by a holding arm 32, 34, 36 to the bottom of which is fixed a bib 38, 40, 42 or any other like flexible pressure means (brush, wheel, roller) whose length is made relatively large in order to apply sufficient pressure to the mail item. The bearing members are disposed perpendicularly to a longitudinal vertical reference wall 44 against which mail items are tamped.

The drive belt 22 is at least as wide as the bib or the spring pressure means, for optimum guidance and lateral alignment of the mail items, which is advantageously encouraged by inclining the belt toward the longitudinal reference wall at a particular angle to the mail item transport direction. This angle depends in particular on the length of the weighing module, and is approximately 2.50° for a weighing module having a weighing platform 60 centimeters (cm) long over which are mounted three bearing members each fitted with a 8 cm wide bib.

The weighing module also incorporates transport rollers 46, 48 for extracting mail items ejected by the feeder module 10, located at the entry end of the module and level with its upstream transverse face 24. Depending on the configuration of the mail processing machine, these rollers may instead be at the exit from the feeder module.

In accordance with the invention, the weighing module has at its entry format sensing means 50 connected to the processing means 30 to supply thereto data relating to the thickness, length, and width of a mail item.

The format sensing means comprise a flag 52 for measuring the length of the mail items, advantageously between the drive rollers and actuated by the front and rear edges of mail items, an optical sensor 54 for measuring the width of the mail items, and a Hall effect sensor 56 for measuring the thickness of the mail items.

It is important to note that, although the format sensing means are in the weighing module in the example shown, this is by no means essential and, given the data link 16A with the feeder module 10, it is perfectly feasible for the corresponding data to be supplied directly by the feeder module if it is designed accordingly.

Figure 3:
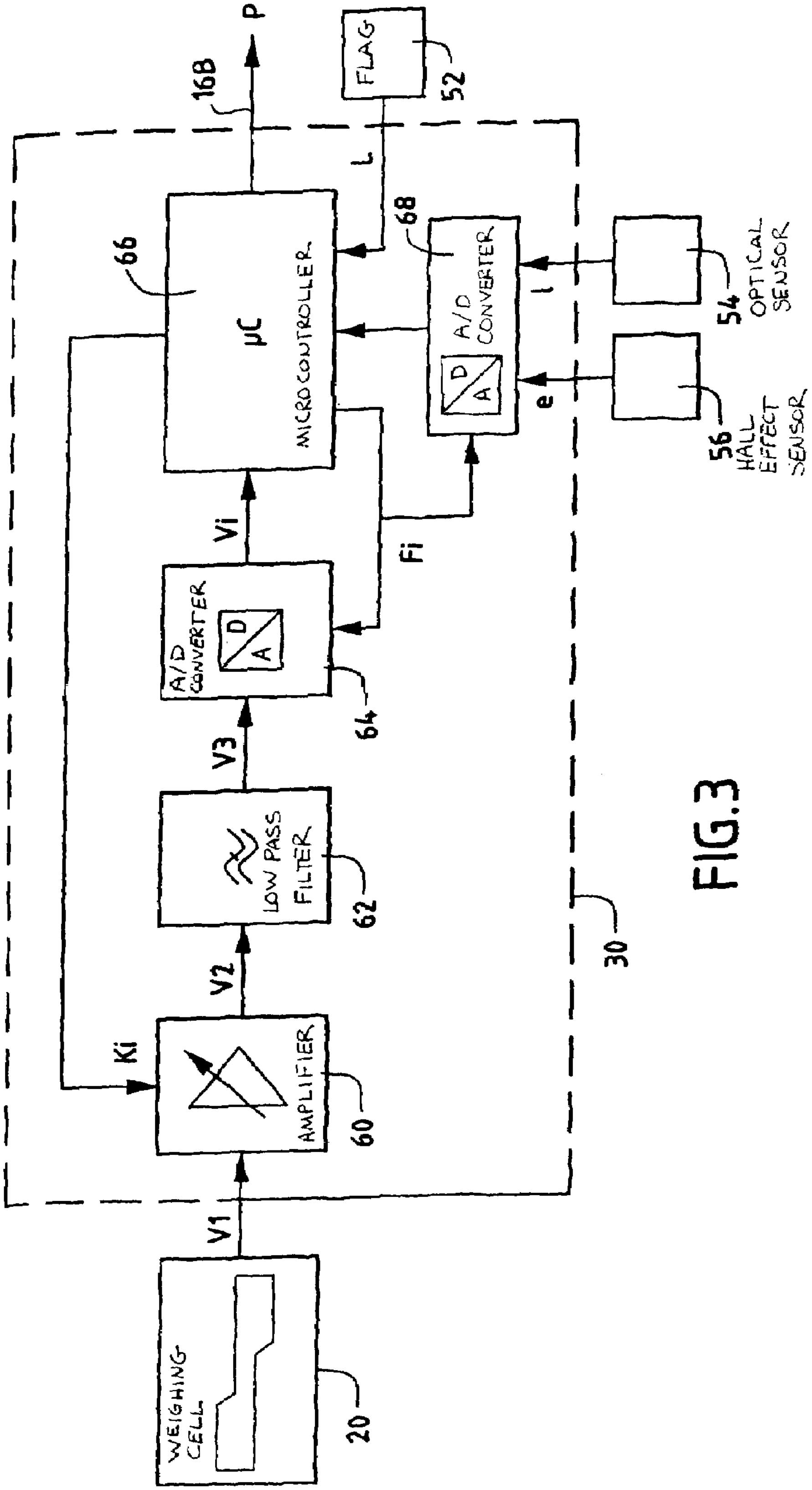
FIG. 3 shows the hardware structure of the control circuit of the FIG. 1 module.

FIG. 3 shows in more detail the hardware structure of the processing means 30 connected to the weighing cell 20, which delivers an analogue measurement signal V1 proportional to the force exerted on internal strain gauges. The signal V1 is amplified in a variable gain amplifier 60 which supplies an amplified signal V2 that is passed through a low-pass filter 62 to eliminate its high-frequency components, and at the output of which a filtered signal V3 is available (this filter also has an anti-aliasing function). The filtered signal is then sampled in an analog-to-digital converter 64 which delivers a series of samples V1 to a microcontroller circuit 66 that processes the digital signals to produce a weight value P that is then sent to the franking machine via the data link 16B for the machine to calculate the franking amount. The microcontroller 66 conventionally comprises calculation means and memory means and receives from the sensors 52, 54, 56 the information relating to the format of the envelopes to be weighed, which, if necessary, is digitized beforehand by a second analog-to-digital converter 68 (a simple counter is sufficient to measure the length). The two converters can have the same or different sampling frequencies Fi, generated by the circuit 66 from its internal clock. However, it should be observed that the second converter 68 is justified only if the signals supplied by the sensors are analog signals.

The processing means 30 in the microcontroller 66 further comprise software that, before determining the weight P of a mail item, determines a probable weight range for the mail item when it enters the weighing module 12, as a function of the format of the mail item.

The inventors have observed that knowing the format of a mail item makes it possible to approximate its weight and that this considerably simplifies weighing it by limiting the measurement range, which also accelerates the measurement. The table below list the dimensions (width, length) of various envelopes used in Europe. A similar table, with different values of course, exists for envelopes used in the USA.

| Envelope type | Width | Length |
|---|---|---|
| C7 | 81 mm | 114 mm |
| C7/C6 | 81 mm | 162 mm |
| C6 | 114 mm | 162 mm |
| B6 | 125 mm | 176 mm |
| E6 | 140 mm | 200 mm |
| DL | 110 mm | 200 mm |
| C6/C5 | 114 mm | 229 mm |
| C5 | 162 mm | 229 mm |
| Italian | 110 mm | 230 mm |
| B5 | 176 mm | 250 mm |
| E5 | 200 mm | 280 mm |
| 1/2BC4 | 125 mm | 324 mm |
| C4 | 229 mm | 324 mm |
| B4 | 250 mm | 353 mm |
| E4 | 280 mm | 400 mm |
| C4 side flap | 324 mm | 229 mm |

For each of the above envelope types, the inventors have established a curve showing the weight of an envelope as a function of its thickness (up to a thickness of 16 mm) when filled with documents of a standard weight per unit surface area and closed. The following table lists some of the results of these measurements, respectively corresponding to DL, C5 and C4 side flap envelopes of four different thicknesses, the first corresponding to maximum thickness allowed for the envelope (beyond which closing it becomes difficult without tearing it) and the last relating to a minimum thickness corresponding to the insertion of only one document per envelope.

| Envelope type | Measured thickness | Measured weight |
|---|---|---|
| 324 × 229 mm (C4 side flap) | 16 mm | 750 g |
| | 8 mm | 360 g |
| | 2 mm | 100 g |
| | Only 1 document inserted | 20 g |
| 162 × 229 mm (C5) | 10 mm | 240 g |
| | 6 mm | 145 g |
| | 2 mm | 55 g |
| | Only 1 document inserted | 10 g |
| 110 × 220 mm (DL) | 6 mm | 90 g |
| | 4 mm | 50 g |
| | 2 mm | 30 g |
| | Only 1 document inserted | 10 g |

Thus the known format of the mail item to be weighed is used to determine a probable weight range for the item and to adjust the gain of the variable gain amplifier 60 accordingly to ensure a maximum excursion of the analog-digital converter 64 to obtain the benefit of its full resolution.

The weighing module operates in the following manner. The measurement process begins with the front edge of the mail item leaving the feeder module 10 passing over the length sensor 52. This produces a start pulse for measuring the length of the item and also for measurement of its thickness by the sensor 56 and its width by the sensor 54. In practice, storing samples from the thickness and width sensors does not begin immediately on passing the flag 52, but rather a few millimeters (for example 20 mm) later, to allow for the non-linear shape of the flag. In order to measure the thickness and the width, while the mail item is moving forwards over the weighing platform 18 and is being transferred to the franking module 14, samples are stored over a particular distance (for example 70 mm) shorter than the shortest envelope side likely to be encountered (that of the C7 format). The measurement of the thickness and the width is therefore finished when the rear edge of the mail item passes over the flag, which returns to its initial rest position, so terminating the measurement of the length of the mail item, and also producing a signal for starting weighing as such, subject to a precautionary offset of 20 mm, for example, as explained above. A series of samples from the weighing cell 20 can then be processed by the amplifier system, whose gain is adjusted beforehand by the micro-controller 66 as a function of the format of the mail item to be weighed, as obtained from the three above-mentioned measurements. The sampling frequency determines the number of samples from which the weight of the mail item is calculated. Modifying the gain of the amplifier system enables the converter always to operate with maximum resolution, and the resulting measurement accuracy is therefore particularly high over the whole range of weights of the weighing module.

Of course, the present invention is not limited to the format sensing means described herein, and any other like device for carrying out the requirement measurements may be envisaged. Thus the length of the mail items may be measured by an optical measuring device and the thickness of the items by a feeler, for example. Similarly, although the module depicted has only one motorized drive belt, it is of course possible to envisage a module comprising a plurality of belts of commensurately reduced width.

What is claimed is:

1. A weighing module comprising a weighing platform incorporating a weighing cell and a motorized drive belt for transporting a mail item from one side to the other of the weighing platform, which weighing module comprises means for sensing the format of said mail item and processing means for calculating the weight of said mail item within a particular range of weights obtained from said format.

2. A device according to claim 1, wherein said format sensing means comprise means for sensing the length of said mail item, means for sensing the thickness of said mail item, and means for sensing the width of said mail item.

3. A device according to claim 2, wherein said means for sensing the length of said mail item include a flag.

4. A device according to claim 2, wherein said means for sensing the thickness of said mail item include a Hall effect sensor.

5. A device according to claim 2, wherein said means for sensing the width of said mail item include an optical sensor.

6. A device according to claim 1, wherein said processing means include a system for amplifying a measurement signal supplied by said weighing cell and wherein the gain of said system is varied selectively as a function of the format of the mail item.

* * * * *